(12) United States Patent
Nogawa et al.

(10) Patent No.: US 12,090,564 B2
(45) Date of Patent: Sep. 17, 2024

(54) COPPER-CERAMIC JOINT BODY, BRAZING MEMBER AND METHOD OF MANUFACTURING COPPER-CERAMIC JOINT BODY

(71) Applicant: Proterial, Ltd., Tokyo (JP)

(72) Inventors: Takashi Nogawa, Tokyo (JP); Shun Takano, Tokyo (JP); Kenji Okishiro, Tokyo (JP); Atsushi Okamoto, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 18/188,517

(22) Filed: Mar. 23, 2023

(65) Prior Publication Data

US 2023/0302562 A1      Sep. 28, 2023

(30) Foreign Application Priority Data

Mar. 24, 2022   (JP) ................. 2022-047963
Mar. 24, 2022   (JP) ................. 2022-047964
Mar. 24, 2022   (JP) ................. 2022-047965

(51) Int. Cl.
| | |
|---|---|
| *B23K 1/19* | (2006.01) |
| *B23K 1/14* | (2006.01) |
| *B32B 15/20* | (2006.01) |
| *B23K 103/00* | (2006.01) |
| *B23K 103/12* | (2006.01) |

(52) U.S. Cl.
CPC ........... *B23K 1/14* (2013.01); *B23K 1/19* (2013.01); *B23K 2103/12* (2018.08); *B23K 2103/52* (2018.08); *B32B 15/20* (2013.01)

(58) Field of Classification Search
CPC ................. B23K 2103/12; B23K 2103/52
See application file for complete search history.

(56) References Cited

U.S. PATENT DOCUMENTS

2020/0006213 A1   1/2020   Terasaki

FOREIGN PATENT DOCUMENTS

| | | |
|---|---|---|
| CN | 108642317 B | 7/2020 |
| JP | 2001-85571 A | 3/2001 |
| JP | 2005-305526 A | 11/2005 |
| JP | 2012-136378 A | 7/2012 |
| JP | 2018-140929 A | 9/2018 |
| JP | 2021-91595 A | 6/2021 |

OTHER PUBLICATIONS

Notification of Reasons for Rejection corresponding to Japanese Patent Application No. 2022-047963, dated Jun. 20, 2023 and its English translation.
Decision of Rejection for Japanese Patent Application No. 2022-047963, dated Aug. 29, 2023.
European Search Report for European Patent Application No. EP23163512.9-1103, dated Aug. 17, 2023.

*Primary Examiner* — Adam Krupicka
(74) *Attorney, Agent, or Firm* — McCormick, Paulding & Huber PLLC

(57) ABSTRACT

A copper-ceramic joint body having high joint strength is provided. The copper-ceramic joint body includes: a copper member made of Cu or Cu alloy; a ceramic member joined to the copper member and made of nitride of Si or Al; and a joint layer formed on joint surfaces of the copper member and the ceramic member, and containing Cu and Mg and further containing at least one type of active metal elements selected from a group of Ti, Zr, Hf, V, Nb, Ta, Cr, Mo, W, Ca, Y, Ce, La, Sm, Yb, Nd, Gd and Er, and shear strength of the joint layer is equal to or higher than 10 MPa.

9 Claims, 6 Drawing Sheets

COPPER-CERAMIC JOINT BODY, BRAZING MEMBER AND METHOD OF MANUFACTURING COPPER-CERAMIC JOINT BODY

CROSS-REFERENCE TO RELATED APPLICATION

This application claims foreign priority benefits under 35 U.S.C. § 119 from Japanese Patent Applications No. 2022-047963, filed Mar. 24, 2022; No. 2022-047964, filed Mar. 24, 2022; and No. 2022-047965, filed Mar. 24, 2022, the contents of each of which are hereby incorporated by reference in their entirety.

TECHNICAL FIELD

The present invention relates to a copper-ceramic joint body, a brazing member and a method of manufacturing the copper-ceramic joint body.

BACKGROUND

A joint body (also referred to as copper-ceramic joint body below) made by joining a copper member and a ceramic member is often used as a constituting material of a power control device mounted on an electrical vehicle and a hybrid vehicle. For the joint between the copper member and the ceramic member, a technique using an active metal brazing member containing silver (Ag) is known. However, in recent years, a joint technique using an active metal brazing member not containing Ag has been proposed in order to solve problems such as Ag migration and high cost (see, for example, a Patent Document 1).

Patent Document 1: Japanese Patent Application Laid-Open Publication No. 2018-140929

SUMMARY

An objective of the present invention is to enhance a joint strength of the copper-ceramic joint body.

An embodiment of the present invention provides a copper-ceramic joint body including: a copper member made of Cu or Cu alloy; a ceramic member joined to the copper member and made of nitride of Si or Al; and a joint layer formed on joint surfaces of the copper member and the ceramic member, and containing Cu and Mg and further containing at least one type of active metal elements selected from a group of Ti, Zr, Hf, V, Nb, Ta, Cr, Mo, W, Ca, Y, Ce, La, Sm, Yb, Nd, Gd and Er, and shear strength of the joint layer is equal to or higher than 10 MPa.

Another embodiment of the present invention provides a brazing member used for joint between a copper member made of Cu or Cu alloy and a ceramic member made of nitride of Si or Al, and the brazing member contains Cu of 65 to 95 at %, Mg of 4.5 to 33 at %, and at least one type of active metal elements selected from a group of Ti, Zr, Hf, V, Nb, Ta, Cr, Mo, W, Ca, Y, Ce, La, Sm, Yb, Nd, Gd and Er of 0.1 to 7 at % in a total ratio.

Still another embodiment of the present invention provides a method of manufacturing the copper-ceramic joint body, the method including: a step of arranging a copper member made of Cu or Cu alloy and a ceramic member made of nitride of Si or Al to be layered through a brazing member; and a step of heating and retaining a layered body made of the copper member and the ceramic member while being pressurized in a layer, and a material containing Cu of 65 to 95 at %, Mg of 4.5 to 33 at %, and at least one type of active metal elements selected from a group of Ti, Zr, Hf, V, Nb, Ta, Cr, Mo, W, Ca, Y, Ce, La, Sm, Yb, Nd, Gd and Er of 0.1 to 7 at % in a total ratio is used as the brazing member.

According to the present invention, joint strength of the copper-ceramic joint body can be enhanced.

BRIEF DESCRIPTIONS OF THE DRAWINGS

Figure 5A:
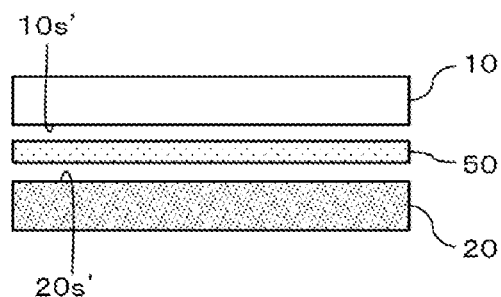
Figure 5B:
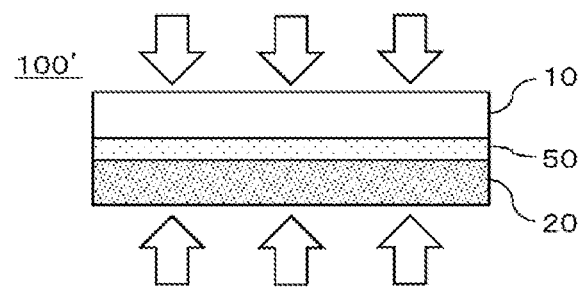
Figure 5C:
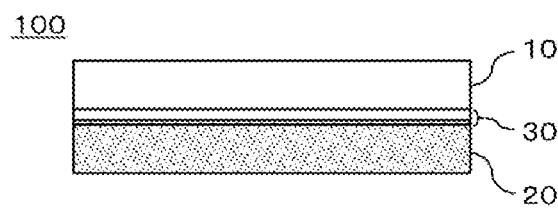
Figure 6:
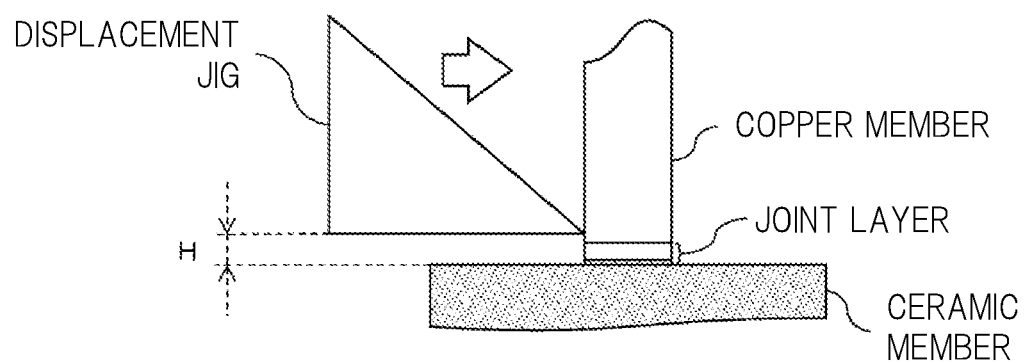
Figure 7:
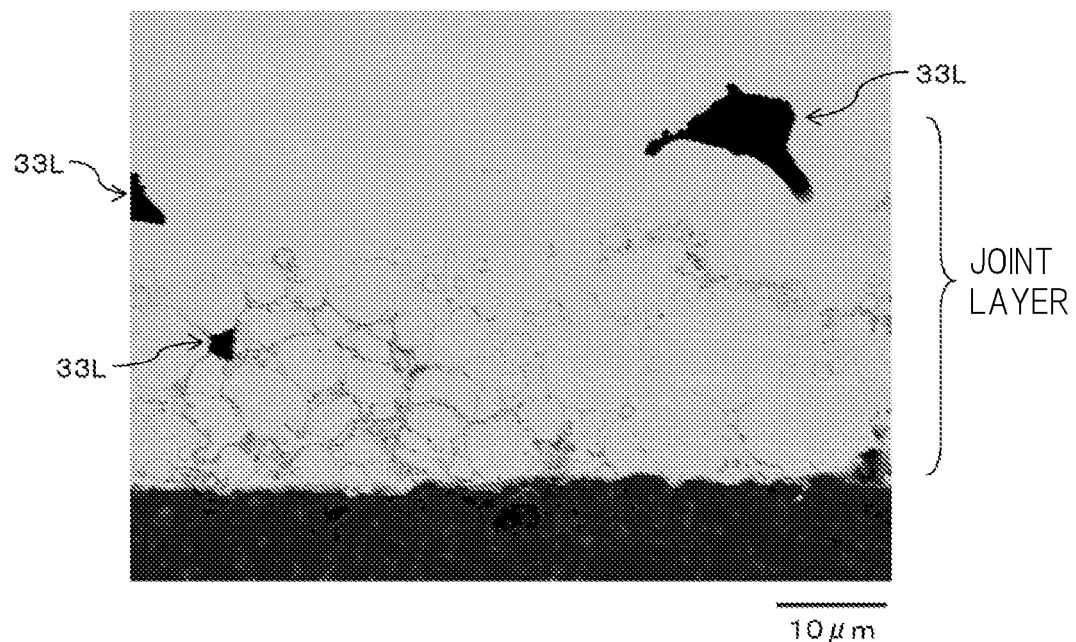

FIG. 5A is a diagram showing a state in which a copper member 10 and a ceramic member 20 are arranged through a brazing member 50;

FIG. 5B is a diagram showing a state in which a layered body made of the copper member 10 and the ceramic member 20 is heated while being pressurized;

FIG. 5C is a diagram showing a manufactured copper-ceramic joint body 100;

FIG. 6 is a diagram schematically showing a state at the time of execution of a shear strength test; and FIG. 7 is an enlarged partial cross-sectional photograph of a joint layer with occurrence of large-size voids 33L.

DETAILED DESCRIPTION

Embodiment of Present Invention

One embodiment of the present invention will be explained below with reference to a drawing group described above. Note that all the drawings used in the following explanation are schematic drawings. A dimension and a ratio of each component shown in the drawings do not always match the practical ones. The dimension and the ratio of each component do not always match even among the drawings.

Configuration of Copper-Ceramic Joint Body

Figure 1:
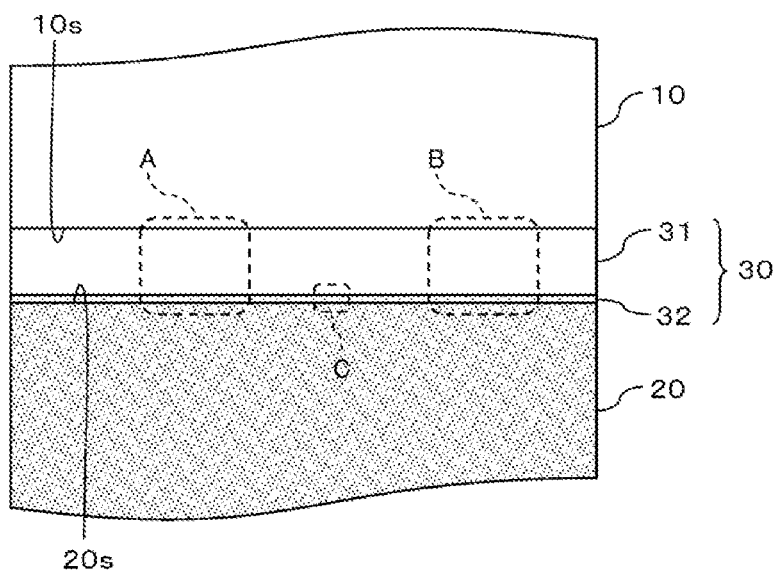
FIG. 1 is an enlarged partial cross-sectional diagram of a copper-ceramic joint body 100 according to an embodiment of the present invention.

As shown in FIG. 1, the copper-ceramic joint body 100 includes the copper member 10 and the ceramic member 20 joined to the copper member 10.

The copper member 10 is made of a pure copper (also referred to as Cu below) or a copper alloy (also referred to as Cu alloy below). As the pure copper, for example, oxygen-free copper, tough pitch copper, or phosphorus-deoxidized copper can be used. As the copper alloy, an alloy containing copper (Cu) as a main element to which at least one type of elements selected from a group of, for example, zinc (An), tin (Sn), phosphorus (P), aluminum (Al), beryllium (Be), cobalt (Co), nickel (Ni), iron (Fe) and manganese (Mn) is added can be used. A shape and a dimension of the copper member 10 are not particularly limited. However, if the copper-ceramic joint body 100 is used as a constituting material of an insulated circuit board, the copper member can be made of a flat plate having a thickness within a range that is, for example, equal to or larger than 0.1 mm and equal to or smaller than 4.0 mm.

The ceramic member 20 is made of a sintered body made of nitride of silicon (Si) or aluminum (Al), that is a silicon nitride expressed by a composition formula $Si_3N_4$, or aluminum nitride expressed by a composition formula AlN. A shape and a dimension of the ceramic member 20 are not particularly limited, either. However, if the copper-ceramic joint body 100 is used as a constituting material of an insulated circuit board, the ceramic member can be made of a flat plate having a thickness within a range that is, for example, equal to or larger than 0.2 mm and equal to or smaller than 4.0 mm. As one example, a case of the ceramic member 20 made of silicon nitride will be explained below.

A joint layer 30 is formed between the copper member 10 and the ceramic member 20 to be along joint surfaces 10s and 20s of these members. The joint layer 30 contains copper (Cu) and magnesium (Mg), and further contains at least one type of active metal elements selected from a group of titanium (Ti), zirconium (Zr), hafnium (Hf), vanadium (V), niobium (Nb), tantalum (Ta), chromium (Cr), molybdenum (Mo), tungsten (W), calcium (Ca), yttrium (Y), cerium (Ce), lanthanum (La), samarium (Sm), ytterbium (Yb), neodymium (Nd), gadolinium (Gd), erbium (Er) and others. As one example, a case of the active metal element that is Ti will be explained below.

As described later, note that the joint layer 30 is formed by a reaction of each of the copper member 10 and the ceramic member 20 with a brazing member 50 (see FIG. 5) containing Cu, Mg and the active metal element at a predetermined ratio. The brazing member 50 used in the present embodiment does not contain Ag, and contains not only Mg and the active metal element but also Cu of a ratio described later. The brazing member 50 used in the present embodiment preferably contains Mg in a form of an intermetallic compound with Cu. Because of the joint using such a brazing member 50, the joint layer 30 in the present embodiment has the following various features.

The various features of the joint layer 30 will be explained below.

(First Feature)

As shown in FIG. 1, the joint layer 30 includes a layered structure made of a first layer 31 configuring a boundary with the copper member 10 and a second layer 32 configuring a boundary with the ceramic member 20. 1 to 2000 μm is exemplified as a thickness of the first layer 31, and 1 to 2000 nm is exemplified as a thickness of the second layer 32.

Figure 2A:
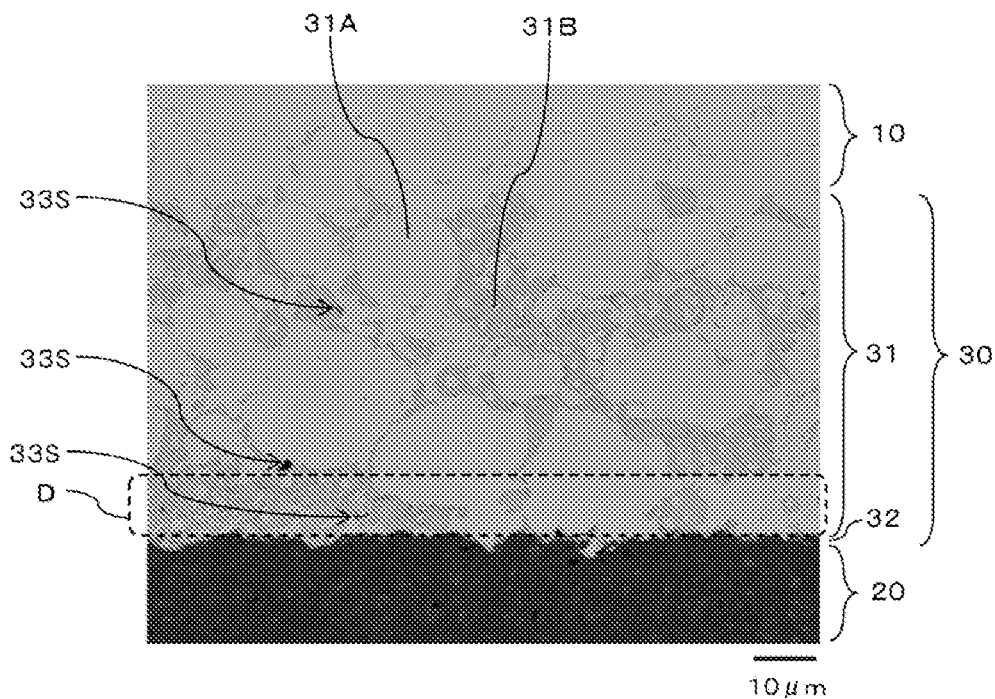
FIG. 2A is an enlarged partial cross-sectional photograph provided by capturing a principal part A of FIG. 1.
Figure 2B:
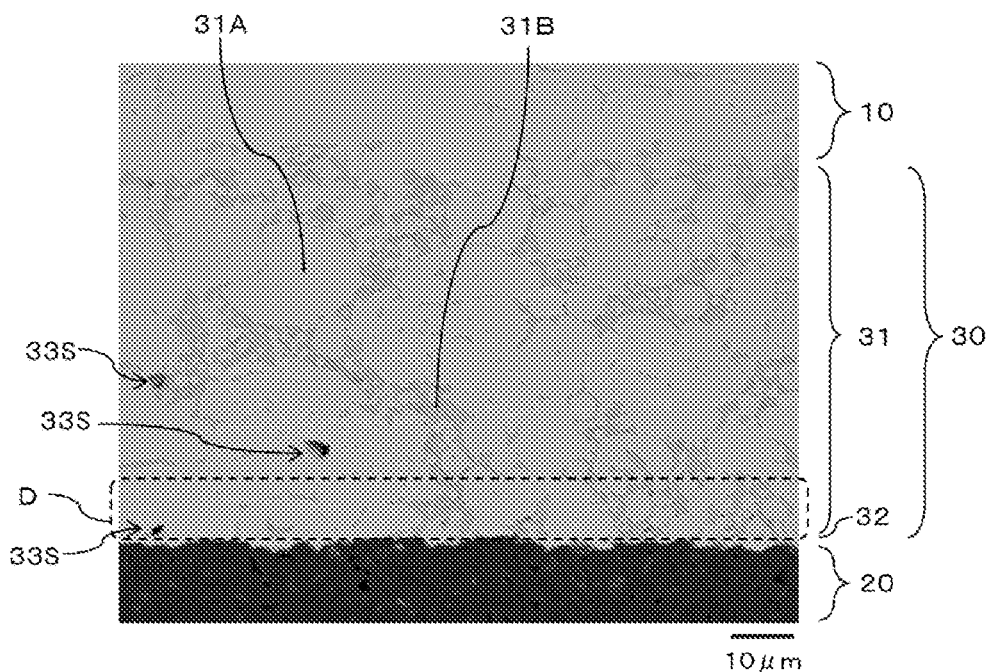
FIG. 2B is an enlarged partial cross-sectional photograph provided by capturing a principal part B of FIG. 1.

In each of FIGS. 2A and 2B, the enlarged cross-sectional photograph of the first layer 31 is exemplified. These photographs are provided by capturing photographs of the first layer 31 and its periphery different in an observation position. As shown in these photographs, the first layer 31 includes a solid solution phase 31A and a compound phase 31B. Phase separation between the solid solution phase 31A and the compound phase 31B occurs to be in a sea-island form. For example, the compound phase 31B is dispersed in an island form in the sea-form solid solution phase 31A that is a continuous phase.

The solid solution phase 31A contains a solid-soluble body of Cu crystals in which Mg is solid-solved, as a main component. The active metal element such as Ti contained in the brazing member 50, Si or Al contained in the ceramic member 20 or others may be solid-solved in the solid solution phase 31A.

The compound phase 31B contains an intermetallic compound of Cu and Mg, that is a compound (also referred to as Cu—Mg alloy) expressed by a composition formula $MgCu_2$ as a main component. An intermetallic compound containing the active metal element may be further deposited in the compound phase 31B. If Ti is selected as the active metal element, at least one type of compounds selected from a compound group expressed by a composition formula $Cu_4Ti$, $Cu_3Ti_2$, $Cu_2Ti$, $Cu_4Ti_3$, $CuTi$, $CuTi_2$, $Ti_5Si_3$, $Ti_3Si$, CuTiSi and others is exemplified as the intermetallic compound containing the active metal element.

The compound phase 31B containing the intermetallic compound as the main component is more brittle than the solid solution phase 31A containing the solid-soluble body as the main component, and may be a cause of significant reduction of the joint strength between the copper member 10 and the ceramic member 20, depending on the formation mode in the first layer 31. This is because, if a brazing member containing not Cu but Mg and the active metal element in a single body is used for the joint between the copper member 10 and the ceramic member 20, the intermetallic compound is formed to concentrate on a near-boundary region D of the first layer 31 adjacent to the second layer 32. If the intermetallic compound is formed to concentrate on the near-boundary region D, a brittle layer structure is formed in the first layer 31 to be along the joint surface. As a result, the joint strength between the copper member 10 and the ceramic member 20 is significantly reduced. In this case, the joint itself between the copper member 10 and the ceramic member 20 may be impossible.

Against such a problem, the present embodiment is succeeded in suppressing the localized formation of the compound phase 31B in the first layer 31 such as the localized formation of the compound phase 31B in the near-boundary region D with the second layer 32 by using the brazing member 50 containing not only Mg and the active metal element but also Cu of a later-described ratio for the joint between the copper member 10 and the ceramic member 20.

Specifically, in the present embodiment, when the first layer 31 is observed at a cross-sectional surface vertical to the joint surfaces 10s and 20s of the copper member 10 and the ceramic member 20, a total cross-sectional area SA of the solid solution phase 31A and a total cross-sectional area SB of the compound phase 31B satisfy a relational expression "SA/(SA+SB)>0.6, preferably >0.7, more preferably >0.8" in the near-boundary region D adjacent to the boundary with the second layer 32, that is a predetermined region of the first layer 31 within a thickness range of 10 μm from the boundary with the second layer 32 toward the copper member 10.

As shown in FIGS. 2A and 2B, note that the compound phase 31B in the present embodiment does not locally concentrate but disperses at a substantially equal formation frequency in the substantially entire region of the first layer 31 in the thickness direction and the substantially entire region of the same in the width direction. Therefore, in the present embodiment, the SA and the SB satisfy the above-described relation in not only the near-boundary region D but also any region inside the first layer 31 except for near-boundary region D (such as any region closer to the copper member 10 than the near-boundary region D). In other words, in the present embodiment, when the first layer 31 is observed at the cross-sectional surface vertical to the joint surfaces 10s and 20s of the copper member 10 and the ceramic member 20, it can be said that the SA and the SB not only satisfy the relation "SA/(SA+SB)>0.6, preferably >0.7, more preferably >0.8" as an average value in the entire region in the thickness direction, but also satisfy the relation "SA/(SA+SB)>0.6, preferably >0.7, more preferably >0.8"

in any localized region in a unit of thickness that is, for example, 10 μm inside the first layer 31.

Since the total cross-sectional areas SA and SB satisfy the above-described relational expression, the brittle layer structure with the localized formation of the compound phase 31B is not formed in the first layer 31 of the present embodiment as shown in each of FIGS. 2A and 2B. And, a path made of the solid solution phase 31A connecting the second layer 32 and the copper member 10 is secured in the first layer 31. This path is excellent in ductility and malleability because of containing the solid-soluble body as the main component, and continuously connects the second layer 32 and the copper member 10 without being divided in middle by the brittle compound phase 31B. This path configures a strong connecting structure between the copper member 10 and the ceramic member 20.

(Second Feature)

In the case using the brazing member containing Mg for the joint between the copper member 10 and the ceramic member 20, there is a concern about generation of voids or pin holes (collectively referred to as voids below) in the first layer 31 because of evaporation of the Mg contained in the brazing member. FIG. 7 shows the enlarged cross-sectional photograph of the joint layer including voids 33L generated by the evaporation of the Mg or others. In FIG. 7, within a field of view of about 3500 μm$^2$, existence of the voids 33L each having a circular equivalent diameter (that is a diameter of a circle having an area equal to a cross-sectional area of the void) that is equal to or larger than 8 μm can be observed. Note that the circular equivalent diameter of the void 33L on the right upper side of FIG. 7 is about 9 to 10 μm, the circular equivalent diameter of the void 33L on the left upper side of FIG. 7 is equal to or larger than 5 μm, and the circular equivalent diameter of the void 33L on the left lower side of FIG. 7 is about 3 to 4 μm.

The existence of the void 33L having such a large size becomes a cause of the reduction of the joint strength between the copper member 10 and the ceramic member 20. In this case, if the brazing member not containing Cu but Mg and the active metal element in a single body is used for the joint between the copper member 10 and the ceramic member 20, the Mg contained in the brazing member is drastically evaporated, and therefore, the voids 33L each having the circular equivalent diameter exceeding 8 μm cannot be avoided from being generated in the first layer 31. As a result, the joint strength between the copper member 10 and the ceramic member 20 is significantly reduced. In this case, the joint itself between the copper member 10 and the ceramic member 20 may be impossible.

Against such a problem, the present embodiment is succeeded in sufficiently suppressing the formation of the large-size voids 33L such as the voids 33L having the circular equivalent diameter of 8 μm or larger in the joint layer 30 because of the usage of the brazing member 50 containing not only Mg and the active metal element but also Cu of the later-described ratio for the joint.

For example, in FIG. 2A, no void 33S having a circular equivalent diameter that is equal to or larger than 3 μm is observed within a field of view of about 10000 μm$^2$, and the number of voids 33S each having a circular equivalent diameter of 1 to 2 μm is only three. And, for example, in FIG. 2B, within the field of view of about 10000 μm$^2$, the number of voids 33S each having a circular equivalent diameter of about 2.5 μm is only one, and the number of voids 33S each having a circular equivalent diameter of about 1 to 2 μm is only two.

As described above, in the observation of the joint layer 30 of the present embodiment at the cross-sectional surface vertical to the joint surfaces 10s and 20s, the joint layer 30 has the extremely excellent feature in which the voids 33L each having the circular equivalent diameter of 8 μm or larger are not observed at all within any field of view of about 10000 μm$^2$.

In the present embodiment, in the observation of the first layer 31 at the cross-sectional surface vertical to the joint surfaces 10s and 20s, even if the voids 33S are observed, its circular equivalent diameter is within the size that is smaller than 8 μm, such as the size that is smaller than 5 μm, more preferably smaller than 3 μm.

Also, in the present embodiment, in the observation of the first layer 31 at the cross-sectional surface vertical to the joint surfaces 10s and 20s, the voids 33S each having the circular equivalent diameter that is smaller than 8 μm such as the voids 33S each having the circular equivalent diameter that is larger than 2 μm and smaller than 8 μm may be observed. However, within any field of view of about 10000 μm$^2$, the number of the voids is extremely small to be smaller than 10, more preferably smaller than 5. Also, in the present embodiment, the voids 33S each having the circular equivalent diameter that is equal to or larger than 1 μm and equal to or smaller than 2 μm may be observed. However, within any field of view of about 10000 μm$^2$, the number of the voids is extremely small to be smaller than 20, more preferably smaller than 10.

(Third Feature)

The second layer 32 of the joint layer 3, the second layer 32 configuring the boundary with the ceramic member 20, contains titanium nitride (TiN) that is a nitride of the active metal element (in this case, Ti as an example) as the main component. If the ceramic member 20 is made of silicon nitride, a compound expressed by a composition formula Ti$_5$Si$_3$ or others may be contained in the second layer 32.

Figure 3:
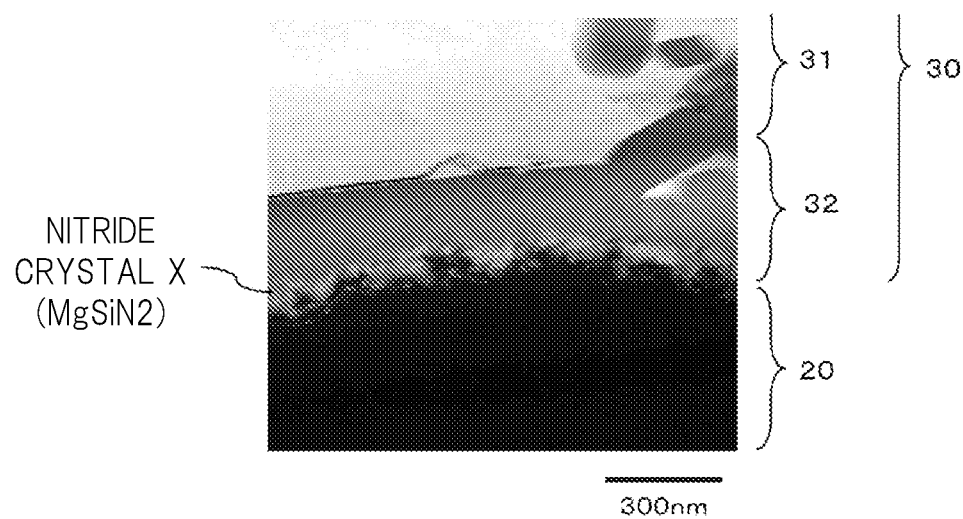
FIG. 3 is an enlarged partial cross-sectional photograph provided by capturing a principal part C of FIG. 1.

In the present embodiment, note that the second layer 32 contains the nitride crystal X expressed by a composition formula MgSiN$_2$. And, as shown in FIG. 3, the nitride crystal X is unevenly distributed to a vicinity of the boundary of the second layer 32 with the ceramic member 20.

When a thickness of the second layer 32 is expressed as "Tx", a thickness of the uneven distribution region of the nitride crystal X is 5 to 50% of the Tx, more preferably about 10 to 40% of the same. For example, as shown in FIG. 3, if the thickness Tx of the second layer 32 is about 250 nm, the thickness of the uneven distribution region of the nitride crystal X is 10 to 150 nm, more preferably about 20 to 100 nm.

The existence of the nitride crystal X can be observed by using, for example, a crystal diffraction method (TEM-PED method) using a precession electron beam diffraction method on the second layer 32.

Note that the second layer 32 in the present embodiment does not substantially contain a nitride crystal Y expressed by a composition formula Mg$_3$N$_2$. The nitride crystal Y cannot be observed even by the analysis using the TEM-PED method.

(Fourth Feature)

Because of having such various features, the present embodiment is exceeded in significantly increasing the joint strength between the copper member 10 and the ceramic member 20.

More specifically, the shear strength of the joint layer 30 of the present embodiment is equal to or higher than 10 MPa, more preferably equal to or higher than 50 MPa. The tensile strength of the joint layer 30 of the present embodiment is equal to or higher than 17.3 MPa, more preferably equal to or higher than 86.6 MPa.

Figure 4A:
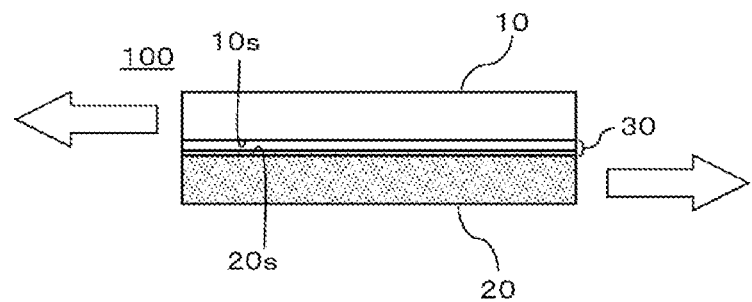
FIG. 4A is a diagram schematically showing a shear stress applied to a joint layer 30.
Figure 4B:
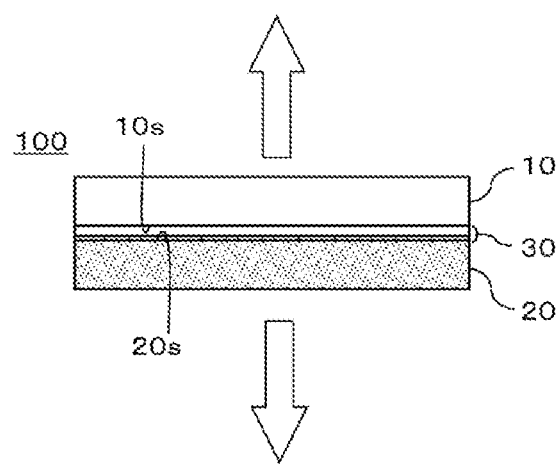
FIG. 4B is a diagram schematically showing a tensile stress applied to the joint layer 30.

Note that shear strength of the joint layer 30 described in the specification means a degree of the shear stress per unit area necessary for breakage (shear breakage) of the joint layer 30 at the time of application of the stress (shear stress) to the joint layer 30 so that the positions of the copper member 10 and the ceramic member 20 shift to be opposite to each other in a direction parallel to the joint surfaces 10s and 20s as shown in FIG. 4A. The tensile strength of the joint layer 30 means the tensile stress per unit area necessary for breakage (peeling breakage) of the joint layer 30 at the time of application of the stress (tensile stress) to the joint layer 30 so that the copper member 10 and the ceramic member 20 separate from each other in a direction vertical to the joint surfaces 10s and 20s as shown in FIG. 4B.

(2) Method of Manufacturing Copper-Ceramic Joint Body

Next, a method of manufacturing the copper-ceramic joint body 100 will be explained with reference to FIGS. 5A to 5C.

First, as shown in FIG. 5A, the copper member 10 and the ceramic member 20 are arranged to be layered through the brazing member 50.

As the brazing member 50, the material containing Cu of 65 to 95 at %, Mg of 4.5 to 33 at %, and the active metal element of 0.1 to 7 at % in a total ratio can be used.

The Cu contained in the brazing member 50 functions as exerting the above-described various features in the joint layer 30 that is formed by the reaction of the brazing member 50 with the copper member 10 and the ceramic member 20. The Mg contained in the brazing member 50 functions as balancing wettability between the copper member 10 and the brazing member 50 and wettability between the ceramic member 20 and the brazing member 50 at the time of the joint between the copper member 10 and the ceramic member 20. The active metal element contained in the brazing member 50 functions as reacting with the ceramic member 20 to form the second layer 32 and increase the joint strength between the joint layer 30 and the ceramic member 20.

If the Cu content is higher than 95 at % because the Mg content contained in the brazing member 50 is lower than 4.5 at % or the active metal element content contained therein is lower than 0.1 at %, the effects resulted from the addition of the Mg or the effects resulted from the addition of the active metal element cannot be provided.

Also, if the Cu content is lower than 65 at % because the Mg content contained in the brazing member 50 is higher than 33 at % or the active metal element total content contained therein is higher than 7 at %, the effect resulted from the addition of the Cu cannot be provided. For example, the SA and the SB do not satisfy the relational expression "SA/(SA+SB)>0.6", and the path made of the solid solution phase 31A connecting the second layer 32 and the copper member 10 cannot be secured in the first layer 31. And, in the observation of, for example, the first layer 31 at the cross-sectional surface vertical to the joint surfaces 10s and 20s, the voids 33L each having the circular equivalent diameter that is equal to or larger than 8 μm are observed. And, for example, the nitride crystal X expressed by the composition formula $MgSiN_2$ is not observed in the second layer 32 configuring the boundary with the ceramic member 20. As a result of these matters, the shear strength and the tensile strength of the joint layer 30 are significantly reduced so that the shear strength is lower than 10 MPa while the tensile strength is lower than 17.3 MPa, and the joint between the copper member 10 and the ceramic member 20 may be practically failed.

Because of these matters, the addition amounts of the Cu, the Mg and the active metal element contained in the brazing member 50 are preferably within ranges that are the Cu content of 65 to 95 at %, the Mg content of 4.5 to 33 at %, and the active metal element total content of 0.1 to 7 at %.

Note that the Cu can be contained in at least any form of its single body (Cu crystal), its hydride (CuH), its intermetallic compound with the Mg ($MgCu_2$) and its intermetallic compound with the active metal element (such as a Cu—Ti compound). The Mg can be contained in at least any form of its single body (Mg crystal), its hydride ($MgH_2$), its intermetallic compound with the Cu ($MgCu_2$) and its intermetallic compound with the active metal element (such as a Mg—Ti compound). If, for example, the Ti is selected as the active metal element, the active metal element can be contained in at least any form of its single body (Ti crystal), its hydride ($TiH_2$), its intermetallic compound with the Cu and its intermetallic compound with the Mg.

The brazing member 50 does not contain the Mg in the form of the Mg single body, but preferably contains the Mg in the form of its intermetallic compound with the Cu ($MgCu_2$). Also, the brazing member 50 preferably contains the Cu in the forms of the Cu single body and its intermetallic compound with the Mg ($MgCu_2$). Since the brazing member 50 has a eutectic crystal composition Cu—$MgCu_2$, a melting point of the brazing member 50 can be decreased. Therefore, the heating temperature at the time of the joint can be decreased, and the Mg can be avoided from being drastically evaporated. As a result, the above-describe various features can be more reliably functioned in the formed joint layer 30.

The form of the brazing member 50 may be any of a powder form, a foil form and a paste form. In the case of the powder form, its average grain diameter (D50) of the powder can be, for example, 5 to 50 μm. In the case of the foil form, its average thickness can be, for example, 5 to 200 μm. In the case of the paste form, alcohols such as terpineol and butanediol or toluene may be used as its main solvent, and poly vinyl alcohol, ethyl cellulose, polymethacrylate, polyacrylate or others may be used as a binder, and besides, a cationic, anionic or nonionic activator may be used as a surfactant. A plasticizer or a dispersant may be further contained.

A publicly-known method such as screen printing, transfer printing, dispensing, ink jetting, spraying, sputtering and deposition can be used as a method for arranging the brazing member 50 in surfaces 10s' and 20s' on which the copper member 10 and the ceramic member 20 are to be joined.

Subsequently, as shown in FIG. 5B, a layered body 100' made of the copper member 10 and the ceramic member 20 arranged through the brazing member 50 is heated and retained under predetermined atmosphere while being pressurized in the layer.

The following conditions are exemplified.

Atmosphere: Any of depressurized atmosphere, inert-gas atmosphere and reduction atmosphere Oxygen Concentration: Equal to or lower than 1000 ppm, preferably equal to or lower than 300 ppm, preferably equal to or lower than 30 ppm Pressure: Equal to or higher than 0.5 kPa Heating Temperature: Equal to or higher than 735° C. and equal to or lower than 900° C.

Retention Time: Such as equal to or longer than 3 minutes and equal to or shorter than 120 minutes although not particularly limited At the time of the heating, a liquid phase is needed to be formed in a part of the brazing member 50, and the active metal element is needed to be melted in this liquid phase. This state can be generated when the heating temperature is equal to or higher than 735° C. However, if the heating temperature is too high, the evaporation of the Mg may be drastic to make it difficult to form the liquid phase or to generate the voids 33L in the formed joint layer 30. Such problems can be avoided when the heating temperature is equal to or lower than 900° C. When the pressure is equal to or higher than 0.5 kPa, the tightly adhesion state between the copper member 10 and the ceramic member 20 through the brazing member 50 can be maintained, and the joint strength between the copper member 10 and the ceramic member 20 can be increased. An upper limit of the pressure can be set to, for example, about 2.0 kPa although not particularly limited. The oxygen component contained in the atmosphere is desirable to be low because of becoming a factor of oxidization of the active metal element and the Mg, and therefore, the above-described concentration range can solve such a problem.

Then, the temperature of the heated layered body 100' is decreased. As a result, as shown in FIG. 5C, the copper-ceramic joint body 100 having the above-described various features is manufactured.

(3) Effect

According to the present embodiment, single or plural effects of the following effects can be provided.

The localized formation of the compound phase 31B in the first layer 31 (such as the localized formation in the near-boundary region D as described above) can be avoided since the copper member 10 and the ceramic member 20 are joined to each other by the brazing member 50 containing not only the Mg and the active metal element but also the Cu of the above-described ratio. As a result, in the observation of the first layer 31 at the cross-sectional surface vertical to the joint surfaces 10s and 20s, the total cross-sectional area SA of the solid solution phase 31A and the total cross-sectional area SB of the compound phase 31B satisfy the relational expression "SA/(SA+SB)>0.6" in the near-boundary region D adjacent to the second layer 32. And, the path made of the solid solution phase 31A connecting the second layer 32 and the copper member 10 can be secured in the first layer 31.

(b) Since the copper member 10 and the ceramic member 20 are joined to each other by the brazing member 50, the formation of the voids 33L in the first layer 31 can be suppressed. As a result, in the observation of the first layer 31 at the cross-sectional surface vertical to the joint surfaces 10s and 20s, the voids 33L each having the circular equivalent diameter that is equal to or larger than 8 μm are not observed within the field of view of 10000 μm$^2$.

(c) Since the copper member 10 and the ceramic member 20 are joined to each other by the brazing member 50, the nitride crystal X expressed by the composition formula MgSiN$_2$ can be contained in the second layer 32. And, the nitride crystal X can be unevenly distributed to the vicinity of the boundary of the second layer 32 with the ceramic member 20.

(d) By at least any of these various features, the joint strength between the copper member 10 and the ceramic member 20 can be dramatically increased. For example, the shear strength of the joint layer 30 can be equal to or higher than 10 MPa, preferably equal to or higher than 50 MPa.

And, the tensile strength of the joint layer 30 can be equal to or higher than 17.3 MPa, preferably equal to or higher than 86.6 MPa.

Another Embodiment of Present Disclosed Invention

The embodiment of the present disclosed invention has been specifically explained above. However, the present disclosed invention is not limited to the above-described embodiment, and various modifications can be made within the scope of the invention.

The example of the usage of silicon nitride or aluminum nitride as the material of the ceramic member 20 has been explained. However, the material is not limited to these materials, and alumina (Al$_2$O$_3$), silicon carbide (SiC), boron carbide (B$_4$C), ZTA (zirconia toughened alumina), a diamond or others may be used. Even in this case, the technique of the present disclosed invention is applicable, and the same effects as those of the above-described embodiment can be provided.

The example of the usage of the copper member 10 made of Cu or Cu alloy as the metal member joined to the ceramic member 20 has been explained. However, the member is not limited to such a member, and a nickel member made of Ni or Ni alloy may be used. Even in this case, the technique of the present disclosed invention is applicable, and the same effects as those of the above-described embodiment can be provided.

The intended use of the copper-ceramic joint body of the present embodiment is not limited to the insulated circuit board, and is widely applicable to various intended uses for components of heat sinks, internal combustions and power generators. Even in this case, the same effects as those of the above-described embodiment can be provided.

EXAMPLES (Samples 1 to 20)

A plate member having a thickness of 0.3 mm and made of silicon nitride was used as the ceramic member, and a plate member having a thickness of 2.0 mm and made of oxygen-free copper was used as the copper member. A pasted mixture of the Cu—Mg alloy powder, the Cu powder and the TiH$_2$ powder of a predetermined ratio was used as the brazing member. In the paste form, polyethylene glycol and diethylene glycol monobutyl ether having a molecular weight that is equal to or lower than 400 were used as the solvent, and a ratio of the solvent in the paste was 9 mass %. An element mixture ratio of "Cu:Mg:Ti" in the paste was as shown in a table 1. The samples 1 to 20 were prepared by applying this paste onto the surface to be joined in the ceramic member by using the screen printing, arranging the copper member directly on the applied paste film, pressurizing the materials under the force of 8 kPa in the layer direction, and heating the materials in the conditions of the table 1 under the vacuum atmosphere of 1.0×10$^{-2}$ Pa or lower.

Then, each first layer of the samples 1 to 20 was observed at the cross-sectional surface vertical to the joint surfaces 10s and 20s, and the cross-sectional area ratio expressed by "SA/(SA+SB)" as described above was measured in the near-boundary region extending from the boundary with the second layer toward the copper member. This observation was made by FE-SEM and EDX. A phase in which the main phase is made of Cu was observed by the EDX, and was regarded as the solid solution phase, while a phase in which the contrast of the reflected electron image is different from that of the solid solution phase was regarded as the compound phase. The total cross-sectional areas and the ratio of these phases were calculated by an image analysis software "Image J (registered trademark)". A range of the analysis was set to 10 μm from the boundary with the second layer, and a range of the width was set to 90 μm.

Then, the shear strength test for the joint layer was performed. In this test, first, the copper member of each of the resultant samples (copper-ceramic joint bodies) 1 to 20 was machined to have a columnar shape having a diameter of 3 mm and a height of 2 mm, and a sample piece with a state of the exposed joint surface of the ceramic member in the periphery of the copper member was prepared. Then, as shown in FIG. 6, the columnar copper member was pressed by a displacement jig in a parallel direction to the joint surface in a state of fixation of the ceramic member of the test piece, a value of the stress at the time of breakage (shear breakage) of the joint layer was measured, and the shear strength of the joint layer was calculated based on the value. Note that the shear test position (that is a height H adjacent to the displacement jig) was set to a height of 200 μm from the exposed surface of the ceramic member, and a moving speed of a displacement axis was set to 100 μm/s.

Based on the result of the shear strength test, the tensile strength of the joint layer was calculated. The tensile strength of the joint layer can be converted from the shear strength by the von Mises formula, and a value of the tensile strength is roughly 1.73 times the value of the shear strength.

The results are shown in the table 1.

As a result of the cross-sectional observation, in all the samples 1 to 20, it has been also verified that (1) the path made of the solid solution phase connecting the second layer and the copper member is secured in the first layer, (2) no void having the circular equivalent diameter that is equal to or larger than 8 μm is observed in the first layer within the field of view of about 10000 μm$^2$, (3) even if the void having the circular equivalent diameter that is larger than 2 μm and smaller than 8 μm is observed in the first layer within the same field of view, the number of the voids is equal to or smaller than 10, preferably equal to or smaller than 5, (4) even if the void having the circular equivalent diameter that is equal to or larger than 1 μm and equal to or smaller than 2 μm is observed in the first layer within the same field of view, the number of the voids is equal to or smaller than 20, preferably equal to or smaller than 10, (5) the second layer contains the nitride crystal X expressed by the composition formula $MgSiN_2$, and (6) the nitride crystal X is unevenly distributed to the vicinity of the boundary of the second layer having the thickness Tx with the ceramic member to have the thickness of 5 to 50% of Tx, preferably about 10 to 40% of Tx.

(Samples 21 and 22)

As similar to the samples 1 to 20, a plate member having a thickness of 0.32 mm and made of silicon nitride was used as the ceramic member, and a plate member having a thickness of 2.0 mm and made of oxygen-free copper was used as the copper member. A pasted mixture containing not the Cu powder but the Mg powder and the $TiH_2$ powder of a predetermined ratio was used as the brazing member. In

TABLE 1

| Sample No. | Element ratio [at %] of Brazing member | | | Process temperature [° C.] | Retention time [min] | Atmosphere | Cross-sectional area ratio [%] | Shear strength [MPa] | Tensile strength [MPa] |
| | Cu | Mg | Ti | | | | | | |
| --- | --- | --- | --- | --- | --- | --- | --- | --- | --- |
| 1 | 77 | 20 | 3 | 740 | 60 | Vacuum state | 65.3 | 71.4 | 123.7 |
| 2 | 79 | 18 | 3 | 740 | 60 | Vacuum state | 62.0 | 72.0 | 124.7 |
| 3 | 81 | 16 | 3 | 740 | 60 | Vacuum state | 76.9 | 71.2 | 123.3 |
| 4 | 83 | 14 | 3 | 740 | 60 | Vacuum state | 79.1 | 62.6 | 108.4 |
| 5 | 85 | 12 | 3 | 740 | 60 | Vacuum state | 93.9 | 63 | 109.1 |
| 6 | 77 | 20 | 3 | 800 | 60 | Vacuum state | 78.5 | 69.0 | 119.5 |
| 7 | 79 | 18 | 3 | 800 | 60 | Vacuum state | 88.9 | 81.7 | 141.5 |
| 8 | 81 | 16 | 3 | 800 | 60 | Vacuum state | 93.5 | 87.6 | 151.7 |
| 9 | 83 | 14 | 3 | 800 | 60 | Vacuum state | 97.1 | 85.9 | 148.8 |
| 10 | 85 | 12 | 3 | 800 | 60 | Vacuum state | 94.4 | 77.0 | 133.4 |
| 11 | 77 | 20 | 3 | 840 | 60 | Vacuum state | 80.1 | 64.0 | 110.9 |
| 12 | 79 | 18 | 3 | 840 | 60 | Vacuum state | 93.4 | 72.0 | 124.7 |
| 13 | 81 | 16 | 3 | 840 | 60 | Vacuum state | 83.8 | 91.8 | 159.0 |
| 14 | 83 | 14 | 3 | 840 | 60 | Vacuum state | 97.9 | 92.2 | 159.7 |
| 15 | 85 | 12 | 3 | 840 | 60 | Vacuum state | 99.5 | 87.0 | 150.7 |
| 16 | 77 | 20 | 3 | 800 | 5 | Vacuum state | 68.5 | 76.8 | 133.0 |
| 17 | 79 | 18 | 3 | 800 | 5 | Vacuum state | 72.1 | 91.2 | 158.0 |
| 18 | 81 | 16 | 3 | 800 | 5 | Vacuum state | 82.8 | 95.6 | 165.6 |
| 19 | 83 | 14 | 3 | 740 | 5 | Vacuum state | 90.5 | 106 | 183.6 |
| 20 | 85 | 12 | 3 | 760 | 5 | Vacuum state | 80.7 | 50.5 | 87.5 |
| 21 | 0 | 97 | 3 | 820 | 60 | Vacuum state | Not observed (No joint) | 0.5 | 0.9 |
| 22 | 0 | 100 | 0 | 820 | 60 | Vacuum state | Not observed (No joint) | 0.1 | 0.2 |

As shown in the table 1, in all the samples 1 to 20, it has been verified that the cross-sectional area ratio expressed by "SA/(SA+SB)" is larger than 0.6. And, in all the samples, it has been verified that the shear strength is equal to or higher than 10 MPa (in these samples, equal to or higher than 50 MPa), and it has been verified that the converted tensile strength based on this is equal to or higher than 17.3 MPa (in these samples, equal to or higher than 86.6 MPa).

the paste form, as similar to the samples 1 to 20, polyethylene glycol and diethylene glycol monobutyl ether having a molecular weight that is equal to or lower than 400 were used as the solvent, and a ratio of the solvent in the paste was 9 mass %. An element mixture ratio of "Cu:Mg:Ti" in the paste was as shown in the table 1. The samples 21 and 22 were prepared by applying this paste onto the surface to be joined in the ceramic member by using the screen printing, arranging the copper member directly on the applied paste film, pressurizing the materials under the force of 8 kPa in the layer direction, and heating the materials in the conditions of the table 1 under the vacuum atmosphere of 1.0× $10^{-2}$ Pa or lower.

Then, the shear strength test was performed for the samples 21 and 22 by the above-described method. As shown in the results of the table 1, the shear strength was equal to or lower than 0.5 MPa, and the tensile strength was equal to or lower than 0.9 MPa, and therefore, it has been verified that these samples cannot provide the practical joint strength (these samples are substantially not joined to each other). Note that these samples did not have the joint strength durable against the machining for the observation of the cross-sectional structure, and therefore, the joint layer was not allowed to be observed at the cross-sectional surface vertical to the joint surface.

Preferable Embodiment of Present Disclosed Invention

A preferable embodiment of the present disclosed invention will be stated below.

An embodiment of the present disclosed invention provides a copper-ceramic joint body including: a copper member made of Cu or Cu alloy; a ceramic member joined to the copper member and made of nitride of Si or Al; and a joint layer formed on joint surfaces of the copper member and the ceramic member, and containing Cu and Mg and further containing at least one type of active metal elements selected from a group of Ti, Zr, Hf, V, Nb, Ta, Cr, Mo, W, Ca, Y, Ce, La, Sm, Yb, Nd, Gd and Er, and shear strength of the joint layer is equal to or higher than 10 MPa (preferably equal to or higher than 50 MPa).

Preferably, tensile strength of the joint layer is equal to or higher than 17.3 MPa (preferably equal to or higher than 86.6 MPa).

Preferably, the joint layer includes: a first layer configuring a boundary with the copper member and including a solid solution phase resulted from solid solution of Mg into Cu; and a second layer configuring a boundary with the ceramic member and containing nitride of the active metal element, the first layer further includes a compound phase containing an intermetallic compound of Cu and Mg, in observation of the first layer at a cross-sectional surface vertical to the joint surfaces, a total cross-sectional area SA of the solid solution phase and a total cross-sectional area SB of the compound phase satisfy a relational expression "SA/(SA+SB)>0.6, preferably >0.7, more preferably >0.8" in a near-boundary region adjacent to a boundary with the second layer.

Preferably, the first layer has a path made of the solid solution phase connecting the second layer and the copper member.

Preferably, in observation of the first layer at the cross-sectional surface vertical to the joint surfaces, no void having a circular equivalent diameter that is equal to or larger than 8 μm is observed within any field of view of 10000 μm².

Preferably, in observation of the first layer at the cross-sectional surface vertical to the joint surfaces, within any field of view of 10000 μm², the number of voids each having a circular equivalent diameter that is larger than 2 μm and smaller than 8 μm is equal to or smaller than 10, preferably equal to or smaller than 5, and the number of voids each having a circular equivalent diameter that is equal to or larger than 1 μm and equal to or smaller than 2 μm is equal to or smaller than 20, preferably equal to or smaller than 10.

Preferably, the second layer contains a nitride crystal X expressed by a composition formula $MgSiN_2$.

Preferably, the nitride crystal X is unevenly distributed to the vicinity of the boundary of the second layer with the ceramic member.

Preferably, the second layer does not substantially contain a nitride crystal Y expressed by a composition formula $Mg_3N_2$.

Another embodiment of the present disclosed invention provides a brazing member used for joint between a copper member made of Cu or Cu alloy and a ceramic member made of nitride of Si or Al, and the brazing member contains Cu of 65 to 95 at %, Mg of 4.5 to 33 at %, and at least one type of active metal elements selected from a group of Ti, Zr, Hf, V, Nb, Ta, Cr, Mo, W, Ca, Y, Ce, La, Sm, Yb, Nd, Gd and Er of 0.1 to 7 at % in a total ratio.

Preferably, the Mg is contained in a form of an intermetallic compound with Cu ($MgCu_2$ crystal).

Preferably, the Cu is contained in a form of Cu single body and a form of an intermetallic compound with Mg.

Still another embodiment of the present disclosed invention provides a copper member with a brazing member joined to a ceramic member made of nitride of Si or Al, the copper member is made of Cu or Cu alloy, and a layer made of the brazing member containing Cu of 65 to 95 at %, Mg of 4.5 to 33 at %, and at least one type of active metal elements selected from a group of Ti, Zr, Hf, V, Nb, Ta, Cr, Mo, W, Ca, Y, Ce, La, Sm, Yb, Nd, Gd and Er of 0.1 to 7 at % in a total ratio is formed in a surface to be joined to the ceramic member.

Still another embodiment of the present disclosed invention provides a ceramic member with a brazing member joined to a copper member made of Cu or Cu alloy, the ceramic member is made of nitride of Si or Al, and a layer made of the brazing member containing Cu of 65 to 95 at %, Mg of 4.5 to 33 at %, and at least one type of active metal elements selected from a group of Ti, Zr, Hf, V, Nb, Ta, Cr, Mo, W, Ca, Y, Ce, La, Sm, Yb, Nd, Gd and Er of 0.1 to 7 at % in a total ratio is formed in a surface joined to the copper member.

Still another embodiment of the present disclosed invention provides a method of manufacturing a copper-ceramic joint body including: a step of arranging a copper member made of Cu or Cu alloy and a ceramic member made of nitride of Si or Al to be layered through a brazing member; and a step of heating and retaining a layered body made of the copper member and the ceramic member while being pressurized in a layer direction, and a material containing Cu of 65 to 95 at %, Mg of 4.5 to 33 at %, and at least one type of active metal elements selected from a group of Ti, Zr, Hf, V, Nb, Ta, Cr, Mo, W, Ca, Y, Ce, La, Sm, Yb, Nd, Gd and Er of 0.1 to 7 at % in a total ratio is used as the brazing member.

What is claimed is:
1. A copper-ceramic joint body comprising:
   a copper member made of Cu or Cu alloy;
   a ceramic member joined to the copper member and made of nitride of Si or Al; and
   a joint layer formed on joint surfaces of the copper member and the ceramic member, and containing Cu and Mg and further containing at least one type of active metal elements selected from a group of Ti, Zr, Hf, V, Nb, Ta, Cr, Mo, W, Ca, Y, Ce, La, Sm, Yb, Nd, Gd and Er, wherein shear strength of the joint layer is equal to or higher than 10 MPa.

2. The copper-ceramic joint body according to claim 1, wherein tensile strength of the joint layer is equal to or higher than 17.3 MPa.

3. The copper-ceramic joint body according to claim 1, wherein the joint layer includes:
- a first layer configuring a boundary with the copper member and including a solid solution phase resulted from solid solution of Mg into Cu; and
- a second layer configuring a boundary with the ceramic member and containing nitride of the active metal element, the first layer further includes a compound phase containing an intermetallic compound of Cu and Mg, in observation of the first layer at a cross-sectional surface vertical to the joint surfaces, a total cross-sectional area SA of the solid solution phase and a total cross-sectional area SB of the compound phase satisfy a relational expression "SA/(SA+SB)>0.6" in a near-boundary region adjacent to a boundary with the second layer.

4. The copper-ceramic joint body according to claim 3, wherein the first layer has a path made of the solid solution phase connecting the second layer and the copper member.

5. The copper-ceramic joint body according to claim 3, wherein, in observation of the first layer at the cross-sectional surface vertical to the joint surfaces, no void having a circular equivalent diameter that is equal to or larger than 8 μm is observed within any field of view of 10000 μm$^2$.

6. The copper-ceramic joint body according to claim 5, wherein, in observation of the first layer at the cross-sectional surface vertical to the joint surfaces, within any field of view of 10000 μm$^2$, the number of voids each having a circular equivalent diameter that is larger than 2 μm and smaller than 8 μm is equal to or smaller than 10.

7. The copper-ceramic joint body according to claim 3, wherein the second layer contains a nitride crystal X expressed by a composition formula $MgSiN_2$.

8. The copper-ceramic joint body according to claim 7, wherein the nitride crystal X is unevenly distributed to the vicinity of the boundary of the second layer with the ceramic member.

9. The copper-ceramic joint body according to claim 3, wherein the second layer does not substantially contain a nitride crystal Y expressed by a composition formula $Mg_3N_2$.

* * * * *